(12) United States Patent
Fabian et al.

(10) Patent No.: US 9,128,245 B2
(45) Date of Patent: Sep. 8, 2015

(54) LOW COST, FAST CURING OPTICAL FIBER COATINGS

(71) Applicant: Corning Incorporated, Corning, NY (US)

(72) Inventors: Michelle Dawn Fabian, Horseheads, NY (US); Kevin Robert McCarthy, Horseheads, NY (US); Weijun Niu, Painted Post, NY (US); David Neal Schissel, Painted Post, NY (US); Michael James Winningham, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/248,737

(22) Filed: Apr. 9, 2014

(65) Prior Publication Data

US 2014/0341521 A1    Nov. 20, 2014

Related U.S. Application Data

(60) Provisional application No. 61/824,479, filed on May 17, 2013.

(51) Int. Cl.
 *G02B 6/02*     (2006.01)
 *G02B 6/245*    (2006.01)
 (Continued)

(52) U.S. Cl.
 CPC ............ *G02B 6/245* (2013.01); *C03C 25/1065* (2013.01); *C09D 4/06* (2013.01); *G02B 1/12* (2013.01); *G02B 6/02395* (2013.01)

(58) Field of Classification Search
 CPC .......... G02B 6/245; G02B 1/12; G02B 1/105; G02B 5/305; G02B 6/02395; C08F 212/08; C08F 220/10; C08F 222/10; C08F 226/08; C09D 135/02; C09D 179/08; C03C 17/3405; B32B 27/30; C09K 19/22; C09K 19/3809
 USPC ................. 385/128; 522/122, 120; 427/163.2
 See application file for complete search history.

(56) References Cited

U.S. PATENT DOCUMENTS 6,025,422 A * 2/2000 Hall ............................. 524/405
6,376,571 B1   4/2002 Chawla et al. .................. 522/64
(Continued)

FOREIGN PATENT DOCUMENTS

JP   2001011343   1/2001
JP   2009205947   9/2009
WO   WO99/42296   8/1999

OTHER PUBLICATIONS

Gloge D., Bibliography, The Bell System Technical Journal 1974, 54(2), pp. 245-262.
(Continued)

*Primary Examiner* — Ellen Kim
(74) *Attorney, Agent, or Firm* — Kevin L. Bray

(57) ABSTRACT

A low cost composition that cures rapidly and which is suitable for coating an optical fiber comprises at least one ethylenically unsaturated monomer; at least one photoinitiator; and at least one non-radiation-curable polar polymer having pendent groups that facilitate low energy chemical bonding, hydrogen bonding, dipolar interactions or other interactions with radical compounds formed during polymerization of the monomer. The non-radiation-curable polar polymer(s) are inexpensive and reduce and/or eliminate the need for expensive urethane acrylate oligomers, without sacrificing properties, and while achieving rapid cure speeds.

25 Claims, 7 Drawing Sheets

(51) Int. Cl.
*G02B 1/12* (2006.01)
*C03C 25/10* (2006.01)
*C09D 4/06* (2006.01)

(56) References Cited

U.S. PATENT DOCUMENTS

| | | |
|---|---|---|
| 6,775,451 B1 | 8/2004 | Botelho et al. ................ 385/128 |
| 6,810,187 B2 | 10/2004 | Fabian et al. ................. 385/128 |
| 6,887,918 B2 | 5/2005 | Khudyakov et al. ............ 522/96 |
| 6,916,855 B2 | 7/2005 | Jansen et al. ................. 522/167 |
| 7,074,858 B2 * | 7/2006 | Heilmann et al. ............ 525/191 |
| 7,276,543 B2 | 10/2007 | Bishop et al. ................. 552/96 |
| 7,371,786 B2 * | 5/2008 | Yoshihara et al. ............ 523/205 |
| 7,423,105 B2 | 9/2008 | Winningham ................ 526/318 |
| 2004/0242804 A1 * | 12/2004 | Medsker et al. ............. 525/407 |
| 2005/0038137 A1 * | 2/2005 | Yoshihara et al. ............ 523/205 |
| 2009/0012208 A1 * | 1/2009 | Madsen et al. ................ 523/113 |
| 2014/0341524 A1 * | 11/2014 | Bookbinder et al. ......... 385/145 |
| 2015/0087769 A1 * | 3/2015 | Hirota et al. .................. 524/576 |

OTHER PUBLICATIONS

Lee T.Y. et al., "Influence of Hydrogen Bonding on Photopolymerization Rate of Hydroxyalkyl Acrylates"; *Macromolecules*, 2004, 37, 3659-3665.

Berchtold K.A. et al., "Reactivity of Monovinyl (Meth)Acrylates Containing Cyclic Carbonates"; *Macromolecules*, 2008, 41, 9035-9043.

* cited by examiner

LOW COST, FAST CURING OPTICAL FIBER COATINGS

This application claims the benefit of priority under 35 U.S.C. §119 of U.S. Provisional Application Ser. No. 61/824,479 filed on May 17, 2013 the content of which is relied upon and incorporated herein by reference in its entirety.

FIELD

This disclosure pertains to low cost, radiation-curable optical fiber coating compositions that cure relatively quickly to achieve compatibility with high speed optical waveguide production processes.

TECHNICAL BACKGROUND

Optical fibers are typically coated with a dual layer coating system, the main purpose of which is to protect the glass fiber from optical, environmental and mechanical failure modes. The coating system consists of a soft inner coating, commonly referred to as the inner or primary coating, and a hard outer coating, commonly referred to as the outer or secondary coating. The properties and dimensions of the coating system are designed to minimize microbend induced attenuation losses while maximizing the mechanical protection of the fragile glass surface.

Optical fiber coatings are typically comprised of the reaction product of acrylate functional oligomers and monomers. Because there are a wide variety of oligomers and monomers commercially available, a wide range of coating properties can be achieved. In order to be compatible with the optical fiber draw process, the coatings must polymerize very quickly upon exposure to the UV light in order to avoid the formation of draw-induced defects. Owing to its low modulus and tensile strength, the primary coating is particularly vulnerable to draw-induced defects. The cure speed of the coating can be increased by adding higher levels of photoinitiators; however, as the photoinitiators are generally some of the most expensive components, the result is increased coating cost. Another expensive component of an optical fiber coating formulation is the urethane acrylate oligomer that typically serves as the main component in the coating. Decreasing or eliminating this component would serve to decrease the cost of the coating formulation. Work at Corning has identified low cost thermoplastic elastomers as replacements for the oligomer in an optical fiber primary coating. While the use of thermoplastic elastomers resulted in primary coatings with favorable physical properties, the resulting coatings also displayed slow cure speeds which limited the speed at which the draw could be run (thereby increasing the cost to produce optical fiber). In addition, the high molecular weight of the thermoplastic elastomers limited the level at which they could be added to the coating without increasing viscosity beyond the range preferred for the optical fiber draw process. In regards to secondary coatings, prior work at Corning has focused on the development of secondary coatings in which the urethane acrylate oligomer is substantially or completely replaced by acrylate monomers as a way to decrease coating cost. While this replacement reduces cost, acrylate monomers are still relatively expensive. Therefore a need still exists for low cost optical fiber coatings that exhibit cure rates that are compatible with a high speed draw process.

The primary coating is applied directly to the glass fiber and, when cured, forms a soft, elastic, and compliant material that encapsulates the glass fiber. The primary coating serves as a buffer to cushion and protect the glass fiber core and cladding when the fiber is bent, cabled, or spooled. The secondary coating is applied over the primary coating and functions as a tough, protective outer layer that prevents damage to the glass fiber during processing and use.

Certain characteristics are desirable for the secondary coating. Before curing, the secondary coating composition should have a suitable viscosity and be capable of curing quickly to enable processing of the optical fiber. After curing, the secondary coating should have the following characteristics: sufficient stiffness to protect the encapsulated, glass fiber yet enough flexibility for handling, low water absorption, low tackiness to enable handling of the optical fiber, chemical resistance, and sufficient adhesion to the primary coating.

To achieve the desired characteristics, conventional secondary coating compositions generally contain urethane-based oligomers in large concentration with monomers being introduced into the secondary coating composition as reactive diluents to lower the viscosity. Because conventional oligomeric components are, in general, much more expensive than the monomeric components, the use of oligomers in high concentration has the effect of increasing the cost of producing secondary coating compositions as well as the resulting optical fiber.

Thus, there remains a need for suitable secondary coating compositions which can be prepared at lower cost than conventional secondary coating compositions and yield secondary coatings with a suitable modulus and other physical properties.

SUMMARY

Disclosed are compositions and methods that address the need for low cost optical waveguide coatings that exhibit cure rates that are compatible with a high speed draw process. The coating compositions contain low cost non-radiation-curable polar polymers as a complete or partial replacement for more expensive urethane acrylate oligomer(s). The coating compositions comprise at least one acrylate monomer and at least one polar polymer. The polar polymer(s) facilitate rapid curing of the acrylate monomer(s) to form a coating at a lower cost when used as a complete or partial replacement of the urethane acrylate oligomer(s). It is believed that the rapid cure rate may be attributed to the ability of the polar polymers to form low energy bonds with or otherwise interact with or stabilize free radical chains formed during curing of the acrylate monomer(s). The bonding, interactions, or stabilization may serve to reduce the termination rate of free radical chains by restricting their mobility and/or inhibiting radical-radical termination reactions, thus allowing the chains to continue in the polymerization process without the delay associated with a step of re-initiating free radical polymerization.

The coating compositions may contain high amounts of the non-radiation-curable polar polymer without increasing the coating viscosity beyond what is compatible with the optical fiber draw process. Inclusion of the non-radiation-curable polar polymer in the coating composition provides high cure rates with low amounts of photoinitiators. A low cost coating composition having excellent properties for optical fiber coatings is thus achieved by limiting the amounts of expensive photoinitiator and urethane acrylate oligomer components in the coating composition. The polymer loaded coatings can be adjusted to produce a desirable range of cured properties on optical fiber.

The polar polymers are non-radiation-curable and lack acrylate or other groups capable of undergoing UV-induced polymerization. The polar polymers may include hydrogen-bonding groups or groups with dipole moments. The polar polymers may include a repeat unit having a pendent group. The pendent group may include oxygen such as in a ketone group, a carbonyl group, an ester group, a carboxyl or carboxylate group, an alcohol group, a sulfonate group an ester group or an ether group. The pendent group may include nitrogen, such as nitrogen bonded to a ketone group or a nitrogen bonded to a carbonyl group, or an alcohol group, or an acid group, or a cyclic group, or a cyclic group that contains nitrogen. The polar polymer may be a homopolymer of the repeat unit. Representative polar polymers include poly (N-vinylpyrrolidone) (PVP), poly(N-vinylcaprolactam), poly(oxazoline) and alkyl-substituted variations thereof.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
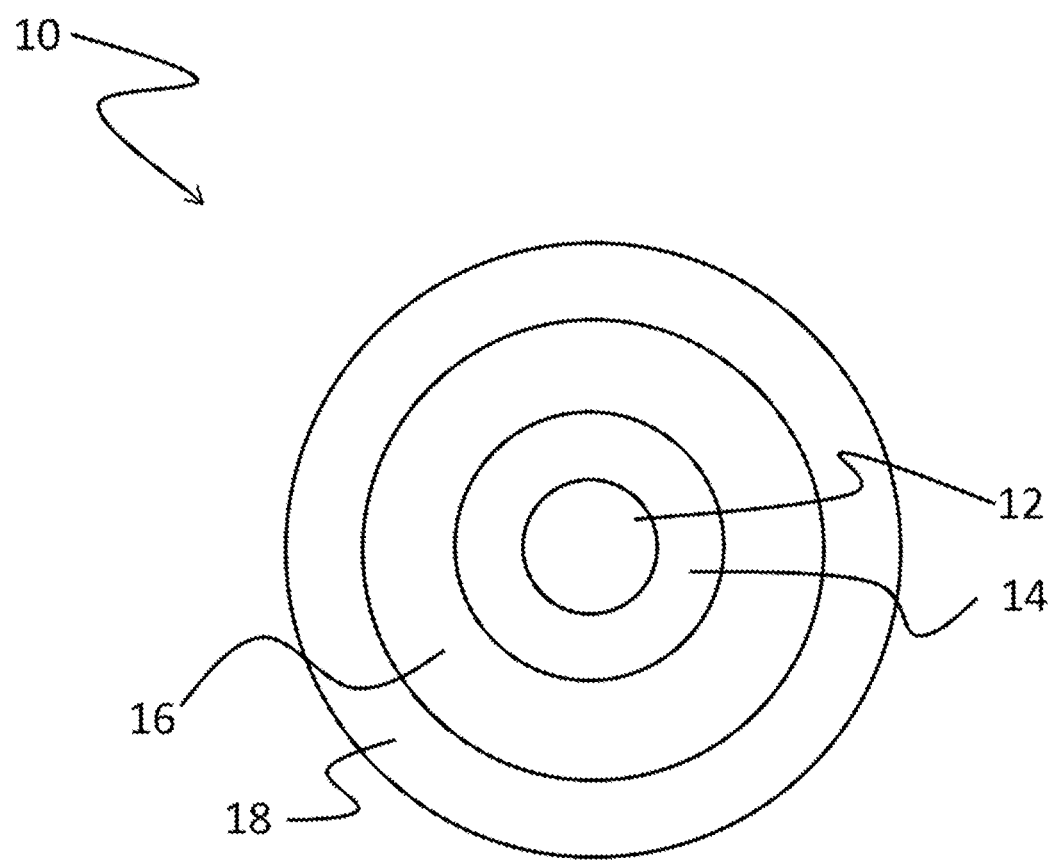
FIG. 1 is a cross-sectional view of a coated optical fiber of this disclosure.

The radiation-curable compositions disclosed herein for coating an optical waveguide (e.g., an optical fiber) include at least one polyfunctional ethylenically unsaturated monomer, at least one photoinitiator, and at least one non-radiation-curable polar polymer having pendent groups that facilitate intermolecular interactions with free radical species formed during curing of the composition. The intermolecular interactions may include low energy chemical bonding, dipolar interactions, Van der Waals interactions, London dispersion interactions, and hydrogen bonding. The radiation-curable compositions may optionally include oligomers, or urethane oligomers, or urethane acrylate oligomers, monofunctional monomers, diluents, reactive diluents, and additives commonly known to those of skill in the art. Radiation-curable compositions in accordance with the present disclosure include primary coating compositions and secondary coating compositions.

The non-radiation-curable polar polymer is selected to interact with reactive or intermediate species that form during polymerization of a polyfunctional or monofunctional monomer. Polymerization of the polyfunctional or monofunctional monomer may occur through a reaction of an ethylenically unsaturated group. The reaction may be a photoinitiated reaction and the polymerization may occur through a free radical process. The free radical polymerization may include initiation, propagation, and termination steps. In the initiation step, free radical compounds are created. In the propagation step, free radical compounds are propagated. Free radical compounds may, for example, react with unreacted monomers in a chain extension reaction. During the process, a distribution of free radical compounds having a variety of chain lengths may be present. In the termination step, free radical compounds are converted to a non-radical form through, for example, chain transfer, disproportionation, and/or radical-radical coupling reactions.

The non-radiation-curable polar polymer may interact with free radical compounds formed during the polymerization process to influence the rates of propagation and/or termination to promote faster curing speeds. The interaction may occur through low energy chemical bonding, hydrogen bonding, polar or dipolar interactions, Van der Waals interactions, and/or London dispersion interactions. The strength of interaction between the non-radiation-curable polar polymer and free radical compounds may be about 0.5 kJ/mol to 16 kJ/mol.

The non-radiation-curable polar polymer may be formed from a monomer that provides a repeat unit, where the repeat unit includes polar pendent groups. The polar pendent groups may include oxygen such as a hydroxyl group, or a ketone group, or a carbonyl group, or a carboxylic acid group, or a carboxylate group, or a sulfonate group, or an ester group, or an ether group, or nitrogen such as nitrogen bonded to a ketone group or nitrogen bonded to a carbonyl group, an alcohol group, a carboxylic acid group, a carboxylate group or a cyclic group, or a cyclic group that includes nitrogen. The non-radiation-curable polar polymers lack radiation-curable groups, such as acrylates, methacrylates, or other radiation-curable ethylenically unsaturated groups.

The backbone of the non-radiation-curable polar polymer may be aliphatic, a polyester, a polyamide, a polyurethane, a polyether, a polycarbonate, or other common structure known to those in the art.

The non-radiation-curable polar polymer may be a homopolymer of a single repeat unit or a copolymer of two or more repeat units, where at least one of the repeat units includes a polar pendent group as described hereinabove. The non-radiation-curable polar polymer may be a copolymer that includes a combination of repeat units with polar pendent groups and repeat units lacking a polar pendent group. Copolymers include block copolymers and random copolymers.

Representative non-radiation-curable polar polymers include polyalcohols, poly(N-vinylpyrrolidone) (PVP), poly (N-vinylcaprolactam), poly(oxazoline) and alkyl-substituted variations thereof.

The non-radiation-curable polar polymer may be present in the coating composition in an amount from 1 wt % to 50 wt %, or from 1 wt % to 45 wt %, or from 5 wt % to 25 wt %, or from 10 wt % to 20 wt %.

Ethylenically unsaturated monomers that can be employed in the disclosed compositions may contain various functional groups that enable chain extension and/or crosslinking in a polymerization reaction. At least one of the ethylenically unsaturated monomers is polyfunctional (i.e., each containing two or more functional groups), although monofunctional monomers can also be introduced into the composition. Therefore, the ethylenically unsaturated monomer(s) can be at least one polyfunctional monomer or a mixture of at least one polyfunctional monomer and at least one monofunctional monomer. Suitable functional groups for ethylenically unsaturated monomers used in accordance with the present description include, without limitation, radiation-curable groups, acrylates, methacrylates, acrylamides, N-vinyl amides, styrenes, vinyl ethers, vinyl esters, acid esters, and combinations thereof.

In general, individual monomers capable of about 80% or more conversion (i.e., when cured) are more desirable than those having lower conversion rates. The degree to which monomers having lower conversion rates can be introduced into the composition depends upon the particular requirements (i.e., strength) of the resulting cured product. Typically, higher conversion rates will yield stronger cured products.

The curable primary coating composition may include a single monomer or a combination of monomers. The monomers may include ethylenically-unsaturated compounds, ethoxylated acrylates, ethoxylated alkylphenol monoacrylates, propylene oxide acrylates, n-propylene oxide acrylates, isopropylene oxide acrylates, mono functional acrylates, mono functional aliphatic epoxy acrylates, multifunctional acrylates, multifunctional aliphatic epoxy acrylates, and combinations thereof. The monomer component may include compounds having the general formula $R_2$—$R_1$—O—$(CH_2CH_2$—$O)_n$—$COCH=CH_2$, where $R_1$ and $R_2$ are aliphatic, aromatic, or a mixture of both, and n=1 to 10, or $R_1$—O—$(CH_2CH_2$—$O)_n$—$COCH=CH_2$, where $R_1$ is aliphatic or aromatic, and n=1 to 10. The monomer component may include compounds having the general formula $R_2$—$R_1$—O—$(CH_2CH(CH_3)$—$O)_n$—$COCH=CH_2$, where $R_1$ and $R_2$ are aliphatic, aromatic, or a mixture of both, and n=1 to 10, or $R_1$—O—$(CH_2CH(CH_3)$—$O)_n$—$COCH=CH_2$, where $R_1$ is aliphatic or aromatic, and n=1 to 10. Representative examples include ethylenically unsaturated monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

The ethylenically unsaturated monomer may be present in the curable primary coating composition in an amount between 2 wt % and 50 wt %, or between 2 wt % and 40 wt %, or between 2 wt % and 30 wt %, or between 5 wt % and 50 wt %, or between 5 wt % and 40 wt %, or between 5 wt % and 30 wt %, or between 10 wt % and 50 wt %, or between 10 wt % and 40 wt %, or between 10 wt % and 30 wt % and the non-radiation-curable polar polymer(s) may be present in an amount between 5 wt % and 45 wt %, or between 10 wt % and 25 wt %.

The monomer component of the curable primary coating composition may also include a polyfunctional (meth)acrylate. As used herein, the term "(meth)acrylate" means acrylate or methacrylate. Polyfunctional (meth)acrylates are (meth)acrylates having two or more polymerizable (meth)acrylate moieties per molecule. The polyfunctional (meth)acrylate may have three or more polymerizable (meth)acrylate moieties per molecule. Examples of polyfunctional (meth)acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), and dipentaerythritol pentaacrylate (e.g., PHOTOMER 4399, IGM Resins, and SR399, Sartomer Company, Inc.). A polyfunctional (meth)acrylate may be present in the primary curable composition at a concentration of from 0.05-15 wt %, or from 0.1-10 wt %.

The monomer component of the curable primary coating compositions may include an N-vinyl amide such as an N-vinyl lactam, or N-vinyl pyrrolidone, or N-vinyl caprolactam. The N-vinyl amide monomer may be present in the primary curable composition at a concentration from 0.1-40 wt %, or from 2-10 wt %.

The curable primary coating composition may include one or more monofunctional (meth)acrylate monomers in an amount from 5-95 wt %, or from 0-75 wt %, or from 40-65 wt %. The curable primary coating composition may include one or more monofunctional aliphatic epoxy acrylate monomers in an amount from 5-40 wt %, or from 10-30 wt %.

The monomer component of the primary curable composition may include a hydroxyfunctional monomer. A hydroxyfunctional monomer is a monomer that has a pendant hydroxy moiety in addition to other reactive functionality such as (meth)acrylate. Examples of hydroxyfunctional monomers including pendant hydroxyl groups include caprolactone acrylate (available from Dow Chemical as TONE M-100); poly(alkylene glycol)mono(meth)acrylates, such as poly(ethylene glycol)monoacrylate, polypropylene glycol) monoacrylate, and poly(tetramethylene glycol)monoacrylate (each available from Monomer, Polymer & Dajac Labs); 2-hydroxyethyl(meth)acrylate, 3-hydroxypropyl(meth)acrylate, and 4-hydroxybutyl(meth)acrylate (each available from Aldrich).

The hydroxyfunctional monomer may be present in an amount sufficient to improve adhesion of the primary coating to the optical fiber. The hydroxyfunctional monomer may be present in the curable primary coating composition in an amount between about 0.1 wt % and about 25 wt %, or in an amount between about 5 wt % and about 8 wt %. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the primary coating. Hydroxyfunctional monomers are described in more detail in U.S. Pat. No. 6,563,996, the disclosure of which is hereby incorporated by reference in its entirety.

The total content of one or more monomers in the curable primary coating composition may be between about 2 wt % and about 95 wt %, or between 2 wt % and 50 wt %, or between 2 wt % and 30 wt %, or between about 30 wt % and about 75 wt %, or between about 40 wt % and about 65 wt % and the non-radiation-curable polar polymer(s) may be present in an amount of 5 wt % to 45 wt %, or 10 wt % to 25 wt %.

The curable primary coating composition may optionally include one or more oligomers in addition to a polyfunctional monomer, a photoinitiator, and non-radiation-curable polar polymer. The oligomer may be a urethane acrylate oligomer, or a urethane acrylate oligomer that includes one or more isocyanate groups, or a urethane acrylate oligomer that includes one or more aliphatic isocyanate groups, or a urethane acrylate oligomer that includes a single isocyanate group, or a urethane acrylate oligomer that includes a single aliphatic isocyanate group.

The oligomer may be an acrylate-terminated oligomer. Preferred acrylate-terminated oligomers for use in the primary curable compositions include BR3731, BR3741, BR582 and KWS4131, from Dymax Oligomers & Coatings; polyether urethane acrylate oligomers (e.g., CN986, available from Sartomer Company); polyester urethane acrylate oligomers (e.g., CN966 and CN973, available from Sartomer Company, and BR7432, available from Dymax Oligomers & Coatings); polyether acrylate oligomers (e.g., GENOMER 3456, available from Rahn AG); and polyester acrylate oligomers (e.g., EBECRYL 80, 584 and 657, available from Cytec Industries Inc.). Other oligomers are described in U.S. Pat. Nos. 4,609,718; 4,629,287; and 4,798,852, the disclosures of which are hereby incorporated by reference in their entirety herein. Additional oligomers that may optionally be included in the curable primary coating composition are described hereinbelow in connection with curable secondary coating compositions.

The oligomer of the curable primary coating composition may include a soft block with a number average molecular weight ($M_n$) of about 4000 g/mol or greater. Examples of such oligomers are described in U.S. patent application Ser. No. 09/916,536, the disclosure of which is incorporated by reference herein in its entirety. The oligomers may have flexible backbones, low polydispersities, and/or may provide cured coatings of low crosslink densities.

The oligomers may be used singly, or in combination to control coating properties. The total oligomer content of the curable primary coating composition may be between about 5 wt % and about 95 wt %, or between about 25 wt % and about 65 wt %, or between about 35 wt % and about 55 wt %.

The curable primary coating composition may include a non-radiation-curable polar polymer, an N-vinyl amide monomer at a concentration of 0.1-40 wt % or 2-10 wt % in combination with one or more difunctional urethane acrylate oligomers in an amount from 5-95 wt %, or from 25-65 wt % or from 35-55 wt %.

The curable primary coating composition may include a non-radiation-curable polar polymer in an amount of 5 wt % to 45 wt %, or 10 wt % to 25 wt %.; one or more monofunctional (meth)acrylate monomers in an amount of from about 5-95 wt %; an N-vinyl amide monomer in an amount of from about 0.1-40 wt %; and one or more difunctional urethane acrylate oligomers that include a polyol and an isocyanate, where the oligomer is present in an amount of from about 5-95 wt %. The polyol in the oligomer may be a polypropylene glycol and the isocyanate may be an aliphatic diisocyanate.

The curable primary coating composition may include a non-radiation-curable polar polymer in an amount from 5 wt % to 45 wt %, or 10 wt % to 25 wt %.; one or more monofunctional (meth)acrylate monomers in an amount of from about 40 wt % to 65 wt % by weight; an N-vinyl amide monomer in an amount of from about 2 wt % to 10 wt %; and one or more polypropylene glycol-based difunctional urethane acrylate oligomers in an amount of from about 35 wt % to 60 wt %.

Suitable photoinitiators for the curable primary coating composition include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenyl-acetophenone (e.g., IRGACURE 651, available from BASF); bis(2,4,6-trimethylbenzoyl)-phenylphosphine oxide (IRGACURE 819); (2,4,6-trimethylbenzoyl)diphenyl phosphine oxide (LUCIRIN TPO, available from BASF); ethoxy(2,4,6-trimethylbenzoyl)-phenylphosphine oxide (LUCIRIN TPO-L from BASF); and combinations thereof.

In addition to the non-radiation-curable polar polymer, monomer(s), oligomer(s), and polymerization initiator(s), the curable primary coating composition may include other additives such as an adhesion promoter, a strength additive, a reactive diluent, an antioxidant, a catalyst, a stabilizer, an optical brightener, a property-enhancing additive, an amine synergist, a wax, a lubricant, and/or a slip agent. Some additives may operate to control the polymerization process, thereby affecting the physical properties (e.g., modulus, glass transition temperature) of the polymerization product formed from the primary curable composition. Other additives may affect the integrity of the polymerization product of the curable primary coating composition (e.g., protect against depolymerization or oxidative degradation).

The secondary coating may be formed from a curable secondary coating composition that includes a non-radiation-curable polar polymer and one or more monomers. The monomers may include ethylenically unsaturated compounds. The curable secondary composition may also include one or more oligomers, one or more polymerization initiators, and one or more additives.

The monomer component of the curable secondary coating composition may include ethylenically unsaturated compounds. The ethylenically unsaturated monomers may be monofunctional or polyfunctional. The functional groups may be polymerizable groups and/or groups that facilitate or enable crosslinking. In combinations of two or more monomers, the constituent monomers may be monofunctional, polyfunctional, or a combination of monofunctional and polyfunctional compounds. Suitable functional groups for ethylenically unsaturated monomers include, without limitation, (meth)acrylates, acrylamides, N-vinyl amides, styrenes, vinyl ethers, vinyl esters, acid esters, and combinations thereof.

Suitable polyfunctional ethylenically unsaturated monomers include, without limitation, alkoxylated bisphenol A diacrylates such as ethoxylated bisphenol A diacrylate with ethoxylation being 2 or greater, or ranging from 2 to about 30 (e.g. SR349 and SR601 available from Sartomer Company, Inc. West Chester, Pa. and Photomer 4025 and Photomer 4028, available from IGM Resins), and propoxylated bisphenol A diacrylate with propoxylation being 2 or greater, or ranging from 2 to about 30; methylolpropane polyacrylates with and without alkoxylation such as ethoxylated trimethylolpropane triacrylate with ethoxylation being 3 or greater, or ranging from 3 to about 30 (e.g., Photomer 4149, IGM Resins, and SR499, Sartomer Company, Inc.), propoxylated-trimethylolpropane triacrylate with propoxylation being 3 or greater, or ranging from 3 to 30 (e.g., Photomer 4072, IGM Resins and SR492, Sartomer), and ditrimethylolpropane tetraacrylate (e.g., Photomer 4355, IGM Resins); alkoxylated glyceryl triacrylates such as propoxylated glyceryl triacrylate with propoxylation being 3 or greater (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl)isocyanurate triacrylate (e.g., SR368, Sartomer Company, Inc.) and tris-(2-hydroxyethyl)isocyanurate diacrylate; alcohol polyacrylates with and without alkoxylation such as tricyclodecane dimethanol diacrylate (e.g., CD406, Sartomer Company, Inc.), polyethylene glycol di(meth)acrylate with ethoxylation being 2 or greater, or ranging from 2 to about 30 and polypropylene glycol di(meth)acrylate with propoxylation being 2 or greater, or ranging from 2 to about 30; epoxy acrylates formed by adding acrylate to bisphenol A diglycidylether (4 up) and the like (e.g., Photomer 3016, IGM Resins); and single and multi-ring cyclic aromatic or non-aromatic poly(meth)acrylates such as dicyclopentadiene di(meth)acrylate and dicyclopentane di(meth)acrylate.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4003, IGM Resins); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is an alkyl group with 7 or more carbons.

Most suitable monomers are either commercially available or readily synthesized using reaction schemes known in the art. For example, most of the above-listed monofunctional monomers can be synthesized by reacting an appropriate alcohol or amide with an acrylic acid or acryloyl chloride.

The ethylenically unsaturated monomer(s) may be present in the curable secondary composition in an amount from 30 wt % to 94.5 wt %, or 50 wt % to 94.5 wt % and the non-radiation-curable polar polymer(s) may be present in an amount of 5 wt % to 45 wt %, or 10 wt % to 25 wt %.

An optional constituent of the curable secondary coating composition is an oligomeric component. The oligomeric component can include a single type of oligomer or it can be a combination of two or more oligomers. When employed, if at all, the oligomeric component introduced into the present compositions preferably comprises ethylenically unsaturated oligomers. The oligomeric component may be present in an amount of 15 wt % or less, or 13 wt % or less, or 10 wt % or less, or 5 wt % or less, or 3 wt % or less, or 1 wt % or less. While maintaining suitable physical characteristics of the composition and its resulting cured material, it is more cost-effective and, therefore, desirable to prepare compositions containing less than about 5 weight percent or substantially devoid of the oligomeric component. Suitable coatings with low or no oligomer content are described, for example, in U.S. Pat. No. 6,775,451, the disclosure of which is hereby incorporated by reference herein.

When employed as components in either curable primary or curable secondary coating compositions, suitable oligomers may be either monofunctional oligomers or polyfunctional oligomers. Polyfunctional oligomers may be preferred. The oligomeric component may also be a combination of a monofunctional oligomer and a polyfunctional oligomer.

Di-functional oligomers that may be included in curable primary or curable secondary coating compositions may have a structure according to formula (I) below:

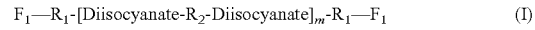
$$F_1—R_1-[\text{Diisocyanate-}R_2\text{-Diisocyanate}]_m\text{-}R_1—F_1 \qquad (I)$$

where $F_1$ is independently a reactive functional group such as acrylate, methacrylate, acrylamide, N-vinyl amide, styrene, vinyl ether, vinyl ester, or other functional group known in the art; $R_1$ includes, independently, $—C_{2-12}O—$, $(C_{2-4}—O)_n—$, $—C_{2-12}O—(C_{2-4}—O)_n—$, $—C_{2-12}O—(CO—C_{2-5}O)_n—$, or $—C_{2-12}O—(CO—C_{2-5}NH)_n—$ where n is a whole number from 1 to 30, or 1 to 10; $R_2$ is polyether, polyester, polycarbonate, polyamide, polyurethane, polyurea, or combinations thereof; and m is a whole number from 1 to 10, or 1 to 5. In the structure of formula I, the diisocyanate group is the reaction product formed following bonding of a diisocyanate to $R_2$ and/or $R_1$. The term "independently" is used herein to indicate that each $F_1$ may differ from another $F_1$ and the same is true for each $R_1$.

Other polyfunctional oligomers that may be included in curable primary or curable secondary compositions may have a structure according to formula (II), formula (III), or formula (IV) as set forth below:

multiisocyanate(—$R_1$—$F_2$)$_x$ (II)

polyol-[(diisocyanate-$R_2$-diisocyanate)$_m$-$R_1$—$F_2$]$_x$ (III)

multiisocyanate-($R_1$—$F_2$)$_x$ (IV)

where $F_2$ independently represents from 1 to 3 functional groups such as acrylate, methacrylate, acrylamide, N-vinyl amide, styrene, vinyl ether, vinyl ester, or other functional groups known in the art; R1 can include —$C_{2-12}O$—, —($C_{2-4}$—O)$_n$—, —$C_{2-12}O$—($C_{2-4}$—O)$_n$—, —$C_{2-12}O$—(CO—$C_{2-5}O$)$_n$—, or —$C_{2-12}O$—(CO—$C_{2-5}NH$)$_n$— where n is a whole number from 1 to 10, or 1 to 5; $R_2$ can be polyether, polyester, polycarbonate, polyamide, polyurethane, polyurea or combinations thereof; x is a whole number from 1 to 10, or 2 to 5; and m is a whole number from 1 to 10, or 1 to 5. In the structure of formula II, the multiisocyanate group is the reaction product formed following bonding of a multiisocyanate to $R_2$. Similarly, the diisocyanate group in the structure of formula III is the reaction product formed following bonding of a diisocyanate to $R_2$ and/or $R_1$.

Urethane monomers and oligomers may be prepared by reacting an aliphatic diisocyanate with a dihydric polyether or polyester, most typically a polyoxyalkylene glycol such as a polyethylene glycol. Such monomers or oligomers may have between about four to about ten or more urethane groups and may be of high molecular weight, e.g., 2000-8000 g/mol. However, lower molecular weight monomers or oligomers, having molecular weights in the 500-2000 g/mol range, may also be used.

Moisture-resistant monomers and oligomers may be synthesized in an analogous manner, except that the polar polyether or polyester glycols are avoided in favor of predominantly saturated and predominantly nonpolar aliphatic diols. These diols include, for example, alkane or alkylene diols of from about 2-250 carbon atoms and may be substantially free of ether or ester groups.

As is well known, polyurea components may be incorporated in monomers or oligomers prepared by these methods, simply by substituting diamines or polyamines for diols or polyols in the course of synthesis.

The curable secondary coating compositions may also contain a polymerization initiator which is suitable to cause polymerization (i.e., curing) of the composition after its application to a glass fiber or previously coated glass fiber. Polymerization initiators suitable for use in the present compositions include thermal initiators, chemical initiators, electron beam initiators, microwave initiators, actinic-radiation initiators, and photoinitiators. Particularly preferred are the photoinitiators. For most acrylate-based coating formulations, conventional photoinitiators, such as the known ketonic photoinitiating and/or phosphine oxide additives, are suitable. When used in the present compositions, the photoinitiator is present in an amount sufficient to provide rapid ultraviolet curing. The amount of photoinitiator may be about 0.5 wt % to about 10.0 wt %, or about 1.5 wt % to about 7.5 wt %.

The photoinitiator, when used in a small but effective amount to promote radiation cure, in either the curable primary coating composition or the curable secondary coating composition, provides reasonable cure speed without causing premature gelation of the coating composition. A desirable cure speed is a speed sufficient to cause substantial curing (i.e., greater than about 90%, or greater than about 95%) of the coating composition in the time of exposure at the total dose of curing radiation. The time of exposure may be less than 60 sec, or less than 30 sec, or less than 15 sec, or less than 10 sec, or less than 5 sec. The total dose may be less than 1.5 J/cm$^2$, or less than 1.0 J/cm$^2$, or less than 0.5 J/cm$^2$. Curing of a primary or secondary coating composition at the stated time of exposure and stated dose may provide a coating thickness of about 25-35 µm. Photoinitiators may be present in the curable primary coating composition and the curable secondary coating composition in an amount of 0.1 wt % to 5 wt %, or 0.5 wt % to 1.5 wt %.

Suitable photoinitiators include, without limitation, 1-hydroxycyclohexyl-phenyl ketone (e.g., Irgacure 184 (available from BASF)), (2,6-diethoxybenzoyl)-2,4,4-trimethylpentyl phosphine oxide (e.g. in commercial blends Irgacure 1800, 1850, and 1700, BASF), 2,2-dimethoxy-2-phenyl acetophenone (e.g., Irgacure, 651, BASF), bis(2,4,6-trimethylbenzoyl)-phenyl phosphine oxide (e.g., Irgacure 819, BASF), (2,4,6-triiethylbenzoyl)diphenyl phosphine oxide (e.g., Lucirin TPO), 2-hydroxy-2-methyl-1-phenylpropane-1-one (e.g., in commercial blend Darocur 4265, BASF) and combinations thereof. Any suitable photoinitiator can be introduced into the present compositions.

In addition to the above-described components a non-radiation-curable polar polymer, one or more monomers, optional oligomers, and photoinitiator, the curable secondary coating composition may optionally include an additive or a combination of additives. Suitable additives include, without limitation, antioxidants, catalysts, lubricants, low molecular weight non-cross-linking resins, adhesion promoters, and stabilizers. Some additives can operate to control the polymerization process, thereby affecting the physical properties (e.g., modulus, glass transition temperature) of the polymerization product formed from the composition. Others may affect the integrity of the polymerization product of the composition (e.g., protect against de-polymerization or oxidative degradation).

A suitable antioxidant is thiodiethylene bis(3,5-di-tert-butyl)-4-hydroxyhydrocinnamate (e.g., Irganox 1035, available from BASF).

A suitable adhesion promoter is an acrylated acid adhesion promoter such as Ebecryl 170 (available from UCB Radcure (Smyrna, Ga.)).

Other aspects of the disclosure relate to a coating or matrix material which is the cured product of a composition as disclosed herein and optical waveguides coated with a cured product of a composition as disclosed herein.

Unless otherwise specified, the weight percents of the non-radiation-curable polar polymer, monomer(s), oligomer(s), and initiator(s) in the primary and secondary compositions sum to 100%. When present, the amount of an additive may be reported herein in units of parts per hundred (pph) relative to the combined amounts of monomer(s), oligomer(s), and initiator(s). An additive present at the 1 pph level, for example, is present in an amount of 1 g for every 100 g of combined non-radiation-curable polar polymer, monomer(s), oligomer(s), and initiator(s).

The curable secondary coating compositions disclosed herein may comprise low amounts of urethane acrylate oligomers (e.g., less than 5% by weight), and low amounts of photoinitiators (e.g., 0.5 to 1.5 pph resin). The non-radiation-curable polar polymer(s) may be present in an amount of 5% to 45% by weight, or 10% to 25% by weight, with the ethylenically unsaturated monomer(s) comprising 30% to 94.5% by weight, or 50% to 94.5% by weight.

The curable secondary coating composition may include a non-radiation-curable polar polymer, be devoid of an oligomeric component and the monomeric component may include ethoxylated(4) bisphenol-A diacrylate monomer, ethoxylated(30) bisphenol-A diacrylate monomer, and epoxy diacrylate monomer. The ethoxylated(4) bisphenol-A diacrylate monomer may be present in an amount ranging from about 50 wt % to about 90 wt %, or from about 60 wt % to about 80 wt %, or and from about 70 wt % to about 75 wt %. The ethoxylated(30) bisphenol-A diacrylate monomer may be present in an amount ranging from about 5 wt % to about 20 wt %, or from about 7 wt % to about 15 wt %, or from about 8 wt % to about 12 wt %. The epoxy diacrylate monomer may be present in an amount of ranging from about 5 wt % to about 25 wt %, or from about 10 wt % to about 20 wt %, or from about 12 wt % to about 18 wt %.

The curable secondary coating composition may include a non-radiation-curable polar polymer, be devoid of an oligomeric component and the monomeric component may include ethoxylated(4) bisphenol-A diacrylate monomer, ethoxylated(10) bisphenol-A diacrylate monomer, and epoxy diacrylate monomer. The ethoxylated(4) bisphenol-A diacrylate monomer may be present in an amount ranging from about 30 wt % to about 80 wt %, or from about 40 wt % to about 70 wt %, or from about 50 wt % to about 60 wt %. The ethoxylated(10) bisphenol-A diacrylate monomer may be present in an amount ranging from about 10 wt % to about 50 wt %, or from about 20 wt % to about 40 wt %, or from about 25 wt % to about 35 wt %. The epoxy diacrylate monomer may be present in an amount ranging from about 5 wt % to about 25 wt %, or from about 10 wt % to about 20 wt %, or from about 12 wt % to about 18 wt %.

The curable secondary coating composition may include a non-radiation-curable polar polymer, be devoid of an oligomeric component, and the monomeric component may include ethoxylated(4) bisphenol-A diacrylate monomer, ethoxylated(10) bisphenol-A diacrylate monomer, ethoxylated(30) bisphenol-A diacrylate monomer, and epoxy diacrylate monomer. The ethoxylated(4) bisphenol-A diacrylate monomer may be present in an amount ranging from about 40 wt % to about 80 wt %, or from about 60 wt % to about 70 wt %. The ethoxylated(10) bisphenol-A diacrylate monomer may be present in an amount ranging from about 1 wt % to about 30 wt %, or from about 5 wt % to about 10 wt %. The ethoxylated(30) bisphenol-A diacrylate monomer may be present in an amount ranging from about 5 wt % to about 20 wt %, or in an amount of about 10 wt %. The epoxy diacrylate monomer may be present in an amount ranging from about 5 wt % to about 25 wt %, or in an amount of about 15 wt %.

The curable secondary coating composition may include a non-radiation-curable polar polymer in amount from 5 wt % to 45 wt %, or from 10 wt % to 25 wt %; 30 wt % to 94.5 wt % of the polyfunctional ethylenically unsaturated monomer, or 30 wt % to 94.5 wt % of the polyfunctional ethylenically unsaturated monomer; be devoid of an oligomeric component; and the monomeric component may include ethoxylated (10) bisphenol A diacrylate monomer, tripropylene glycol diacrylate monomer, ethoxylated (4) bisphenol A diacrylate monomer, and epoxy diacrylate monomer. The ethoxylated (10) bisphenol A diacrylate monomer may be present in an amount ranging from about 10 wt % to about 50 wt %. The tripropylene glycol diacrylate monomer may be present in an amount from about 5 wt % to about 40 wt %. The ethoxylated (4) bisphenol A diacrylate monomer may be present in an amount from about 10 wt % to about 55 wt %. The epoxy diacrylate monomer may be present in an amount up to about 15 wt %.

The curable secondary coating composition may include a non-radiation-curable polar polymer and may further comprise from about 40 wt % to 80 wt % of ethoxylated (4) bisphenol A monomer, from about 0 wt % to about 30% of ethoxylated (10) bisphenol A monomer, from about 0 wt % to about 25% wt % of ethoxylated (30) bisphenol A monomer, from about 5 wt % to 18 wt % of epoxy acrylate, from about 0 wt % to 10 wt % of tricyclodecane dimethanol-diacrylate monomer, from about 0.1 wt % to 40% of one or more photoinitiators, from about 0 pph to 5 pph by weight of slip additive; and from 0 pph to about 5 pph by weight of an antioxidant. The secondary composition may further comprise 3% or less oligomer, or 1% or less oligomer, or may be devoid of oligomer. The epoxy acrylate may be an epoxy acrylate monomer. The epoxy acrylate may be bisphenol A epoxy diacrylate. The epoxy acrylate may be an unmodified epoxy acrylate, for example an epoxy acrylate which is not modified with fatty acid, amine, acid, or aromatic functionality. The monomeric component may include an alkoxylated bisphenol A diacrylate monomer having at least 10 alkoxy groups.

The curable secondary compositions may have a viscosity at 45° C. of at least about 3 Poise and when cured, may exhibit a Young's modulus of from 220 MPa to 2200 MPa, or from 400 MPa to 2100 MPa, or from 800 MPa to 2000 MPa. The compositions may exhibit a glass transition temperature of at least about 55° C. The tensile strength of the secondary composition, when cured, may be between 5 MPa and 65 MPa, or between 7 MPa and 55 MPa, or between 10 MPa and 45 MPa.

Another aspect of this disclosure relates to an optical fiber coated with a composition as described. Referring to FIG. 1, the optical fiber 10 may include a glass core 12, a cladding layer 14 surrounding and adjacent to the glass core 12, a primary coating material 16 that encapsulates and adheres to the cladding layer 14, and one or more secondary (or outer) coating materials 18 encapsulating the primary coating material 16.

Any conventional material can be used to form the glass core 12, such as those described in U.S. Pat. No. 4,486,212 to Berkey. The core is typically a silica based glass having a cylindrical cross section and a diameter ranging from about 5 to about 10 μm for single-mode fibers and about 20 μm to about 100 μm for multi-mode fibers. The core may optionally contain varying amounts of other material such as, e.g., oxides of titanium, thallium, germanium, and boron, which modify the core's refractive index. Other dopants which are known in the art can also be added to the glass core to modify its properties.

The primary coating material 16 is the polymerization product of any suitable primary coating composition, including those disclosed herein. Typically, such conventional primary coating compositions contain a high concentration of one or more oligomeric components (e.g., polyether urethane acrylate oligomers, polyester urethane acrylate oligomers, polyurea urethane acrylate oligomers, polyether acrylate oligomers, polyester acrylate oligomers, polyurea acrylate oligomers, epoxy acrylate oligomer, and hydrogenated polybutadiene oligomers), one or more monomeric components as reactive diluents or cross-linking agents, adhesion promoters which promote adhesion of the primary coating to the underlying glass fiber, polymerization initiators, and other known additives. Further information about primary coating compositions is described hereinabove.

The primary coating may be a soft coating having a low Young's modulus or in situ modulus.

As used herein, the in situ modulus of a primary coating refers to the modulus measured by the technique now described. A six-inch fiber sample is used for the measurement. A one-inch section from the center of the six-inch sample is window stripped and wiped with isopropyl alcohol. The sample is mounted on a sample holder/alignment stage equipped with 10 mm×5 mm aluminum tabs to which the sample is glued. Two tabs are set so that the 10 mm length is laid horizontally with a 5 mm gap between two tabs. The fiber is laid horizontally on the sample holder across the tabs. The coated end of the fiber is positioned on one tab and extended halfway into the 5 mm space between the tabs. The stripped glass is positioned over the other half of the 5 mm gap and on the other tab. The sample is lined up and then moved out of the way so that a small dot of glue can be applied to the half of each tab closest to the 5 mm gap. The fiber is then brought back over the tabs and centered. The alignment stage is then raised until the glue just touches the fiber. The coated end is then pulled through the glue such that the majority of the sample in the 5 mm gap between the tabs is stripped glass. The very tip of the coated end is left extended beyond the glue on the tab so that the region to be measured is left exposed. The sample is left to dry. The length of fiber fixed to the tabs is trimmed to 5 mm. The coated length embedded in glue, the non-embedded length (between the tabs), and the end-face primary diameter are measured.

Measurements are performed on a Rheometrics DMTA IV or comparable instrument at a constant strain of 9e-6 1/s for forty-five minutes at room temperature (~21° C.). The gauge length is 15 mm. Force and the change in length are recorded and used for the calculation of primary in situ modulus. Samples are prepared by removing any epoxy from the tabs that would interfere with the 15 mm clamping length. Removal of the epoxy insures that there is no contact of epoxy with the fiber and that the sample is secured squarely to the clamps. The instrument force is zeroed out and the non-coated end is mounted to the lower clamp (measurement probe). The tab containing the coated end of the fiber is mounted to the upper (fixed) clamp. The test is then executed.

The in situ modulus of the primary coating may be less than 3.0 MPa, or less than 1.5 MPa, or less than 1.0 MPa, or less than 0.50 MPa, or less than 0.20 MPa, or less than 0.15 MPa.

The tensile strength of the primary coating may be between 0.3 MPa and 5 MPa, or between 0.4 MPa and 4 MPa, or between 0.5 MPa and 3 MPa. The Young's modulus of the primary coating may be between 0.3 MPa and 5 MPa, or between 0.4 MPa and 4 MPa, or between 0.5 MPa and 3 MPa. Techniques for measuring tensile strength and Young's modulus are described hereinbelow.

The secondary coating material 18 is the polymerization (i.e., cured) product of a secondary composition as disclosed herein. It is preferred that the outer surface of the secondary coating material 18 not be tacky so that adjacent convolutions of the optical fiber (i.e., on a process spool) can be unwound.

The curable coating compositions may comprise 2% to 30% by weight, and from 5% to 45% by weight of the non-radiation-curable polar polymer. or 30% to 94.5% by weight of the polyfunctional ethylenically unsaturated monomer, Another aspect of this disclosure relates to a method of making an optical fiber. Basically, this method can be performed by standard methods with the use of a composition as disclosed herein.

Briefly, the process involves fabricating the glass fiber (core 12 and cladding layer 14), applying a primary coating composition to the glass fiber, polymerizing or curing the primary coating composition to form the primary coating material 16, applying a secondary coating composition to the coated glass fiber, and polymerizing or curing the secondary coating composition to form the secondary coating material 18. Optionally, the secondary coating composition can be applied to the coated fiber before polymerizing the primary coating composition, in which case only a single polymerization step is employed.

The core and cladding layer may be typically produced in a single operation or multi-step operation by methods which are well known in the art. Suitable methods include: the double crucible method as described, for example, in Midwinter, Optical Fibers for Transmission, New York, John Wiley, pp. 166-178 (1979); rod-in-tube procedures; and doped deposited silica processes, also commonly referred to as chemical vapor deposition ("CVD") or vapor phase oxidation. A variety of CVD processes are known and are suitable for producing the core and cladding layer used in the present optical fibers. They include external CVD processes (Blankenship et al., "The Outside Vapor Deposition Method of Fabricating Optical Waveguide Fibers," IEEE J. Quantum Electron., 18:1418-1423 (1982), axial vapor deposition processes (Inada, "Recent Progress in Fiber Fabrication Techniques by Vapor-phase Axial Deposition," IEEE J. Quantum Electron. 18:1424-1431 (1982), and modified CVD or inside vapor deposition (Nagel et al., "An Overview of the Modified Chemical Vapor Deposition (MCVD) Process and Performance," IEEE J. Quantum Electron. 18:459-476 (1982)).

The primary and secondary coating compositions can be coated on a glass fiber using conventional processes, for example, on a draw tower.

The glass fibers may be drawn from a specially prepared, cylindrical preform which has been locally and symmetrically heated to a temperature sufficient to soften the glass, e.g., of about 2000° C. for a silica glass. As the preform is heated, such as by feeding the preform into and through a furnace, a glass fiber is drawn from the molten material. The primary and secondary coating compositions are applied to the glass fiber after it has been drawn from the preform, preferably immediately after cooling. The coating compositions are then cured to produce the coated optical fiber. The method of curing can be thermal, chemical, or radiation induced, such as by exposing the applied (and uncured) coating composition on the glass fiber to ultraviolet light, actinic radiation, microwave radiation, or electron beam, depending upon the nature of the coating composition(s) and polymerization initiator being employed.

To achieve uniform coverage of the fiber with the primary or secondary coating composition during processing, it is necessary for the viscosity of the primary or secondary coating composition to be within a specified range. The viscosity of the primary or secondary coating composition may be between 50 cP and 3000 cP, or between 75 cP and 2000 cP, or between 100 cP and 1500 cP, or between 200 cP and 1200 cP, or between 300 cP and 900 cP.

It is frequently advantageous to apply both the primary coating composition and any secondary coating compositions in sequence following the draw process. One method of applying dual layers of coating compositions to a moving glass fiber is disclosed in U.S. Pat. No. 4,474,830 to Taylor. Another method for applying dual layers of coating compositions onto a glass fiber is disclosed in U.S. Pat. No. 4,581,165 to Rannell et al. The primary coating composition can be applied and cured to form the primary coating material 16, then the secondary coating composition(s) can be applied and cured to form the secondary coating material 18. At least one of the primary or secondary coatings is comprised of a coating composition as disclosed herein.

EXAMPLES

The following examples illustrate the benefits of including a non-radiation-curable polar polymer in a coating composition. Several coating compositions using PVP or poly(oxazoline) as illustrative non-radiation-curable polar polymers were considered. Specific compositions are described in Tables 1-4 below. The PVP and poly(oxazoline) materials were purchased from commercial suppliers.

The compositions in Tables 1, 2, 3 and 4 were prepared with the listed components using commercial blending equipment. The monomer, oligomer (where applicable), and polymer components were weighed into a jacketed beaker heated to 60° C.-70° C. Blending was continued until a homogeneous mixture was obtained. The photoinitiators were then weighed and added to the beaker. Blending was then continued until a homogeneous mixture as obtained.

A Brookfield CAP2000 viscometer was used to measure the viscosity of selected coating compositions. The plate was heated to 25° C. A few (3-4) drops of the coating composition were placed on the plate and a spindle #4 was used to measure the viscosity at a speed of 100 rpm.

The cure speed of the coating compositions was evaluated using a Fourier Transform Infrared Spectroscopy technique. An uncured film was applied to an ASI DuraSamplir® ATR crystal (or equivalent) at ~1 micron thickness. The film was purged with nitrogen for 30 seconds, and then irradiated to induce polymerization with, e.g., Lesco Mark II spot cure unit and UniBlitz® VS25 shutter Assembly with model TI32 driver. The shutter was opened for a 1 sec exposure, and spectra were collected at 6 ms intervals for 0.9 seconds. Following the 0.1 second pause, spectra were again collected for 5 seconds following initial exposure. The shutter was again opened for a 10 second exposure which allowed for calculation of the 100% cured band ratio. Both uncured and fully cured band ratio were calculated for each, and a cure vs. time plot was constructed using conventional software. The polymerization rate, $R_p$, could be calculated at any point in the curve from the slope of the curve, and the maximum polymerization rate was estimated as the slope of the curve from 10% conversion to 40% conversion. The cure speed was the slope of the line within this range and is reported in units of % conversion/sec.

The mechanical properties of cured coatings were measured using an Instron 2G load cell frame. Tensile strength, % elongation, and Young's modulus values of cured coatings were determined. The coatings were injected into 0.0024 inch ID tubing and irradiated with a dose of 1.5-2.5 $J/cm^2$ using a 600 W Fusion UV curing system to produce cured coating rods. The rods were cut into samples 5 inches in length for testing. The rods were then pulled to failure using the Instron instrument and the instrument software was used to calculate mechanical properties.

The coatings detailed below in Table 1 were used to generate the data illustrated in FIG. 2. PEGDA is polyethyleneglycol diacrylate monomer (MW=258). PVP (poly(N-vinylpyrrolidone, MW=2500) and poly(oxazoline) (MW=5000) are non-radiation-curable polar polymers in accordance with the present disclosure. Lucirin TPO and Irgacure 184 are photo initiators.

TABLE 1

Polar Polymers in PEGDA Monomer

| Coating ID | PEGDA monomer control | PEGDA + PVP | PEGDA + Poly(oxazoline) |
|---|---|---|---|
| Polyethylene glycol diacrylate monomer (MW 258) (wt %) | 97 | 77 | 87 |
| Poly(N-vinylpyrrolidone) (MW 2500) (wt %) | 0 | 20 | 0 |
| Poly(oxazoline) (MW 5000) (wt %) | 0 | 0 | 10 |
| Lucirin TPO (wt %) | 1.5 | 1.5 | 1.5 |
| Irgacure 184 (wt %) | 1.5 | 1.5 | 1.5 |
| Cure speed (% conversion/sec) | 140 | 175 | 150 |

The data in Table 1 illustrates the cure speed benefit realized by the addition of either PVP or poly(oxazoline) to polyethyleneglycol diacrylate monomer. Inclusion of a non-radiation-curable polar polymer in the coating composition leads to an increase in cure speed.

Figure 2:
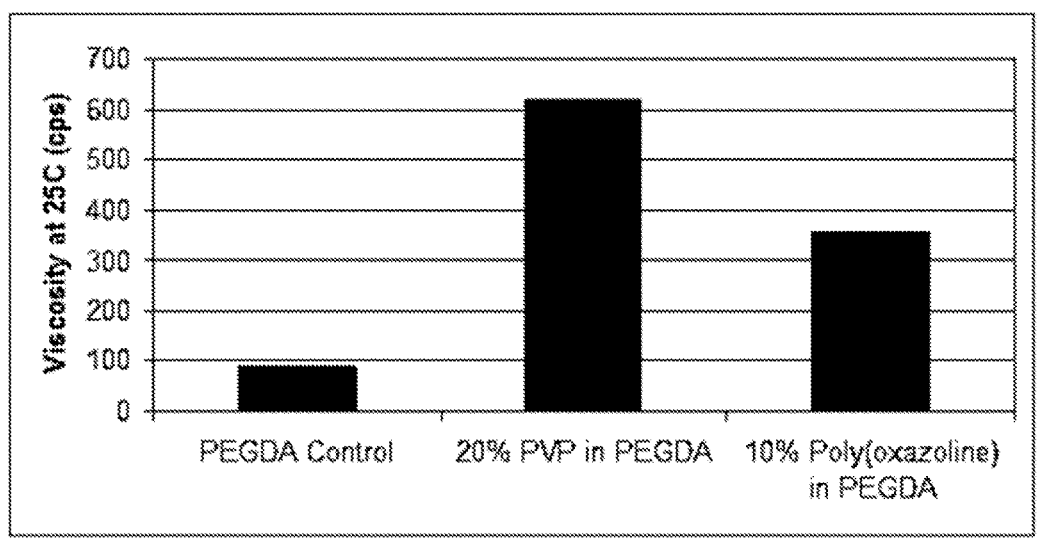
FIG. 2 shows viscosity data for PEGDA monomer, PEGDA with 20% by weight PVP polymer, and PEGDA with 10% by weight polyoxazoline.

The data in FIG. 2 illustrates the effect on viscosity (in units of centipoise (cP)) of the PEGDA monomer when PVP or poly(oxazoline) are incorporated into the coating by comparing the viscosity of a composition of pure PEGDA monomer with the viscosity of a composition containing 80 wt % PEGDA and 20 wt % PVP and a composition containing 90 wt % PEGDA and 10 wt % poly(oxazoline). The data indicate that inclusion of a non-radiation-curable polar polymer leads to an increase in the viscosity of the composition. Despite the increase in viscosity, the coating compositions with PVP and the poly(oxazoline) remain well within the guidelines required for conventional optical fiber draw processes.

Figure 3:
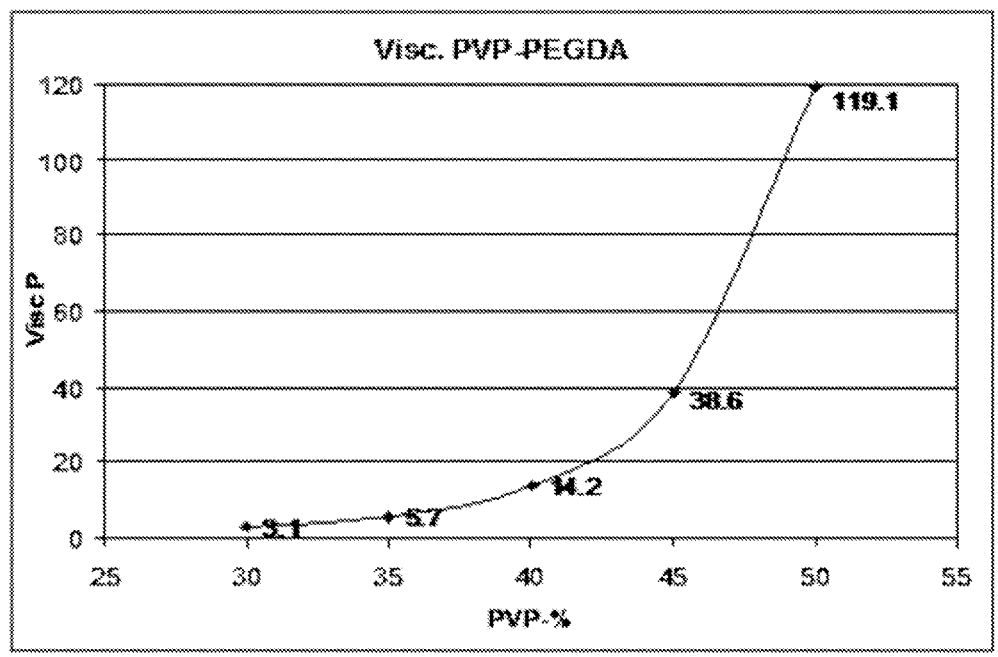
FIG. 3 shows viscosity of PEGDA/PVP loaded formulations.

The data in FIG. 3 illustrates the effect of PVP loading on coating viscosity. Viscosity measurements of PEGDA formulations loaded with 30, 35, 40, 45, and 50% PVP were taken at 25° C. using a Brookfield CAP2000 viscometer. The data illustrate that the increase in viscosity is approximately proportional to the increase in PVP loading in the PEGDA formulations. A temperature-viscosity profile can be generated to obtain coating viscosities that are compatible with conventional optical fiber draw processes.

Figure 4:
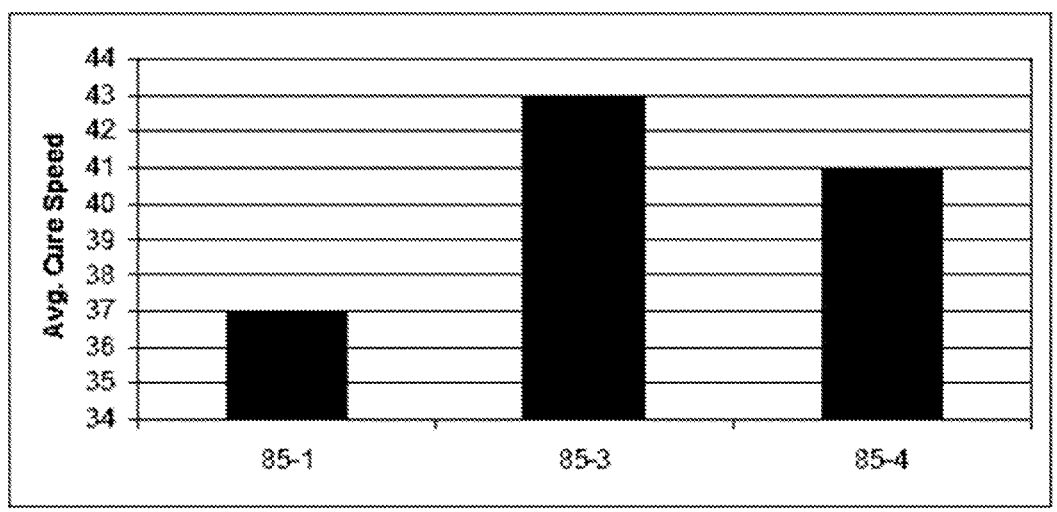
FIG. 4 is a chart showing real time FTIR cure speed data for a control optical fiber primary coating (85-1) and the same coating with 5% by weight PVP (85-3) and 5% by weight poly(oxazoline) (85-4).

The coatings detailed in Table 2 were used to generate the cure speed data illustrated in FIG. 4 (reported in units of % conversion/sec). BR-3741 is an aliphatic polyether urethane acrylate oligomer (reaction product of α-hydroxy, w-hydroxy poly[oxy(methyl-1,2-ethanediyl] with 1,1'-methylenebis[4-isocyanate-cyclohexane], end-capped with 2-hydroxyethyl acrylate). Lucirin TPO is a photoinitiator (2,4,6-trimethyl-benzoyl-diphenylphosphine oxide). and THF acrylate (tetrahydrofurfuryl acrylate) is a mono functional monomer also known as 2-propenoic acid, (tetrahydro-2-furaryl methyl ester).

Coating composition 85-1 is a control composition that lacks a non-radiation-curable polar polymer. Coating compositions 85-2 and 85-33 are coating compositions in accordance with the present disclosure that include a non-radiation-curable polar polymer.

TABLE 2

Coating composition details - Urethane/acrylate primary coatings with polar polymers.

| Coating ID | 85-1 | 85-3 | 85-4 |
|---|---|---|---|
| BR3741 (wt %) | 52 | 47 | 47 |
| THF acrylate (wt %) | 46.5 | 46.5 | 46.5 |
| PVP (MW 2500) (wt %) | 0 | 5 | 0 |
| Polyoxazoline (wt %) | 0 | 0 | 5 |
| Lucirin TPO (pph) | 1.5 | 1.5 | 1.5 |

The data in FIG. 4 demonstrates an increase in cure speed when a non-radiation-curable polar polymer is incorporated into an optical fiber primary coating composition that includes both a monomer and an oligomer. The cure speed benefit afforded by the non-radiation-curable polar polymer is realized for coating compositions that include monomers or combinations of monomers and oligomers.

Figure 5A:
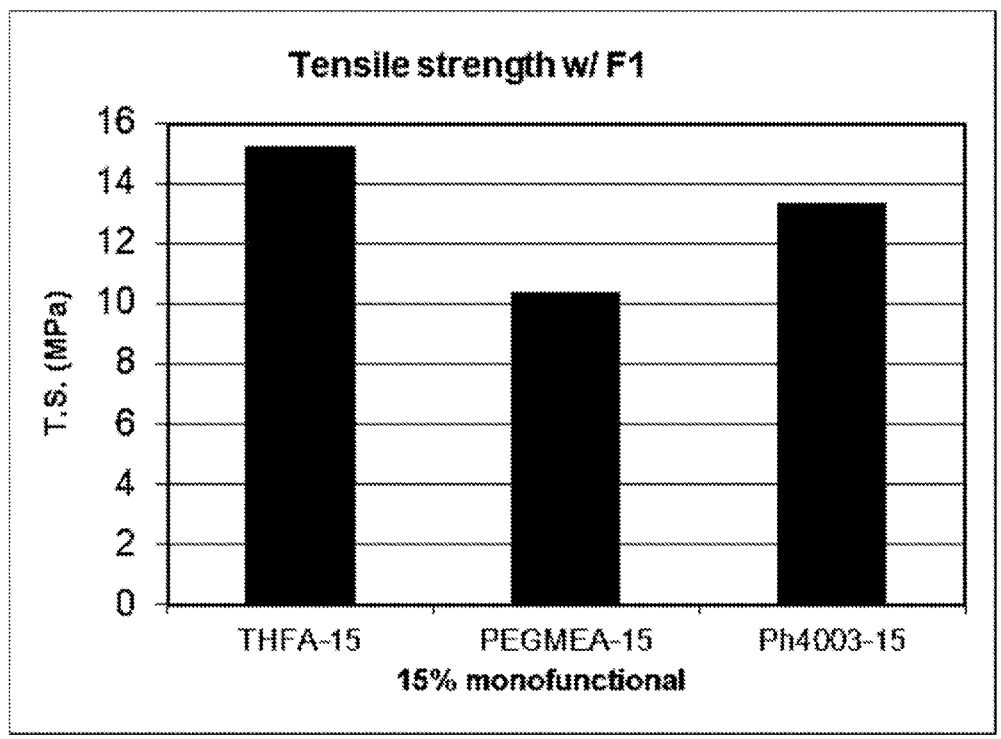
FIGS. 5A, 5B and 5C show physical property data of PEGDA/PVP formulations with 15% mono-functional monomer loading.
Figure 5B:
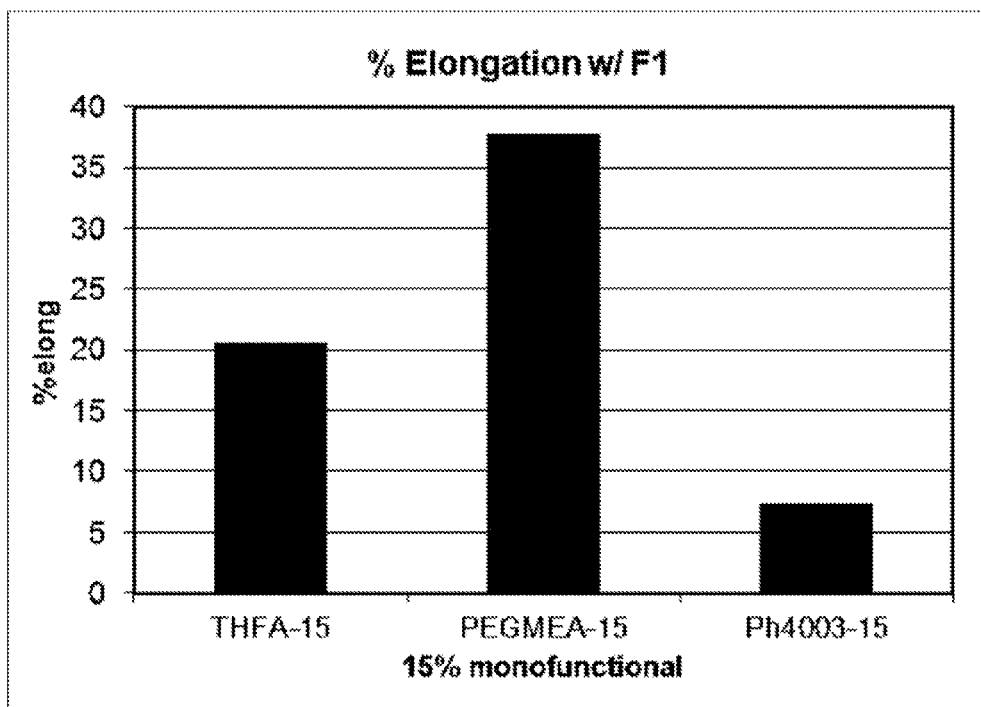
Figure 5C:
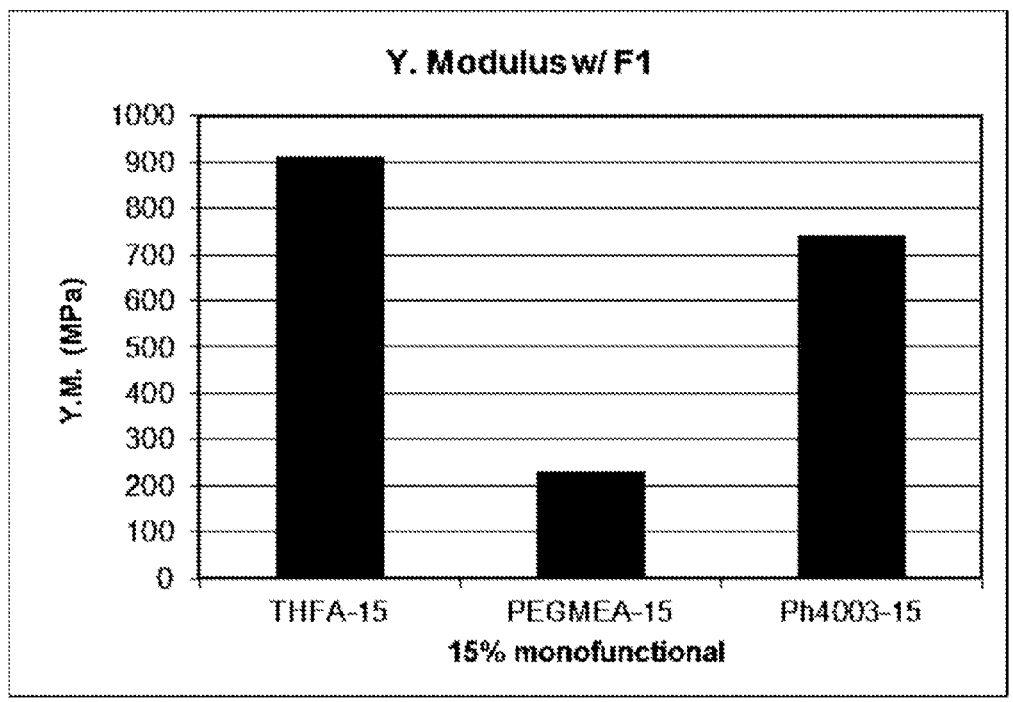

The coatings detailed in Table 3 were used to generate the tensile strength, % elongation, and Young's modulus (Y.M.) data illustrated in FIGS. 5A, 5B, and 5C.

TABLE 3

Coating composition details - PEGDA/PVP formulations with 15% mono-functional monomers

| Coating ID | THFA-15 | PEGMEA-15 | Ph4003-15 |
|---|---|---|---|
| PEGDA (MW 258) (wt %) | 40 | 40 | 40 |
| PVP (MW 2500) (wt %) | 45 | 45 | 45 |
| THF acrylate (wt %) | 15 | 0 | 0 |
| PEGMEA (wt %) | 0 | 15 | 0 |
| Ph4003 (wt %) | 0 | 0 | 15 |
| Lucirin TPO (pph) | 1.5 | 1.5 | 1.5 |

PEGDA is polyethylene glycol diacrylate. PEGMEA is polyethylene glycol methyl ethyl acrylate. Ph4003 is non-ylphenol ethoxylated monoacrylate. THF acrylate, PEGMEA and Ph4003 are monofunctional monomers. Lucirin TPO is a photoinitiator. The compositions in Table 3 include combinations of a difunctional monomer and non-radiation-curable polar polymer with three different monofunctional monomers. The designation "F1" in FIGS. 5A, 5B, and 5C signifies "monofunctional monomer".

The data illustrated in FIGS. 5A, 5B, and 5C demonstrate that a wide range of coating properties can be achieved by simply changing the co-monomer in the PVP/PEGDA coating compositions. The tensile strength, % elongation, and Young's modulus of the cured coating can be controlled over a wide range of values through the selection of monofunctional monomer used in conjunction with the polyfunctional monomer and non-radiation-curable polar polymer.

To further elucidate the effect of non-radiation-curable polar polymers on acrylate coating cure speed, an additional set of coatings using a poly(phenoxyethyl)acrylate (PEA)/tripropylene glycol diacrylate (TPGDA) base formulation was examined. The coating compositions are given in Table 4. The base composition V0 was modified with a pure PVP polymer to provide composition V6. The base composition V0 was modified with a 1:1 vinylpyrrolidone/methyl methacrylate co-polymer (P(VPD-MMA)) to provide composition V2.

TABLE 4

PEA/TPGDA Coating Compositions

| Coating ID | V0 | V6 | V2 |
|---|---|---|---|
| PEA (wt %) | 100 | 80 | 80 |
| PVP (wt %) | — | 20 | — |
| P(VPD-MMA) (1:1) (wt %) | — | — | 20 |
| TPGDA (pph) | 11 | 11 | 11 |
| Lucirin TPO (pph) | 3.0 | 3.0 | 3.0 |

The P(VPD-MMA) copolymer is non-radiation curable and includes more polar vinylpyrrolidone (VPD) repeat units and less polar methyl methacrylate (MMA) repeat units. By varying the degree of polarity of the copolymer, the cure speed enhancement can be controlled. Inclusion of two or more repeat units provides opportunities to control tensile strength and other properties of the cured coating. Non-radiation-curable copolymers can be used to balance and optimize cure speed with one or more chemical or mechanical properties of the cured coating.

Synthesis of P(VPD-MMA) occurred according to the following reaction using the procedure described below:

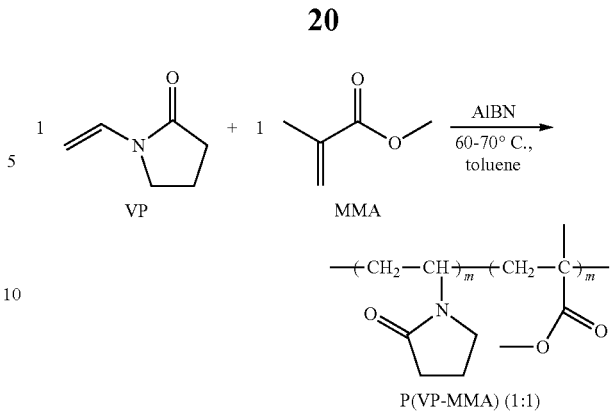

Synthesis of P(VPD-MMA) (1:1): To a round-bottom flask, 25.64 g (297.83 mmol) of methyl methacrylate, 33.10 g (297.83 mmol) of 1-vinyl-2-pyrrolidone, 1.17 g (7.13 mmol) of azobisisobutyronitrile (AIBN, an initiator), 4.70 g (29.32 mmol)) of C9H19SH (a chain transfer agent), and 58.74 g of solvent toluene were added. Under nitrogen protection, the reaction solution mixture was heated at 60° C. overnight. With stirring, the resulting clean solution was poured into hexane solvent (700 mL) to form a white powder product that was washed with more hexane. This white powder product was dried under vacuum overnight (45.67 g, 78%). GPC (THF): Mn=1,389 g/mol, Mw=2,124 g/mol.

The Young's modulus, tensile strength, % elongation, and cure speed of coatings formed from compositions V0, V6, and V2 are presented in Table 5.

TABLE 5

Tensile and cure speed properties of PEA/TPGDA coating compositions

| Coating ID | V0 | V6 | V2 |
|---|---|---|---|
| Young's Modulus (MPa) | 4.7 | 23.1 | 26.0 |
| Tensile Strength (MPa) | 2.8 | 3.5 | 5.7 |
| % Elongation | 58 | 59 | 89 |
| Avg. Cure Speed (% conversion/sec) | 111 | 142 | 119 |

A cure speed enhancement of the base coating composition was observed with addition of a pure PVP polymer in composition V6 and a smaller cure speed enhancement was observed with addition of less polar P(VPD-MMA) in composition V2. The mechanical characteristics of the coating formed by curing composition V2, however, were superior to those obtained from composition V6. The results obtained for composition V2 show that the mechanical characteristics of cured coatings can be controlled without sacrificing cure speed when including a non-radiation-curable polar polymer or copolymer in accordance with the present disclosure.

The described embodiments are preferred and/or illustrated, but are not limiting. It will be apparent to those skilled in the art that various modifications and variations can be made without departing from the spirit or scope of the description. Since modifications combinations, sub-combinations and variations of the disclosed embodiments incorporating the spirit and substance of the illustrated embodiments may occur to persons skilled in the art, the present description should be construed to include everything within the scope of the appended claims and their equivalents.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

What is claimed is:

1. A radiation-curable composition for coating an optical waveguide comprising:
   at least one polyfunctional ethylenically unsaturated monomer;
   at least one photoinitiator; and
   at least one non-radiation-curable polar polymer, the non-radiation-curable polar polymer having a repeat unit that includes a pendent group, the pendent group comprising oxygen.

2. The composition of claim 1, wherein the composition includes 30% to 94.5% by weight of the polyfunctional ethylenically unsaturated monomer.

3. The composition of claim 1, wherein the composition includes 2% to 30% by weight of the polyfunctional ethylenically unsaturated monomer.

4. The composition of claim 1, wherein the total amount of composition includes 5% to 45% by weight of the non-radiation-curable polar polymer.

5. The composition of claim 1, wherein the composition has a viscosity between 100 cP and 1500 cP.

6. The composition of claim 1, wherein the pendent group comprises a carbonyl group.

7. The composition of claim 6, wherein the pendent group further comprises nitrogen.

8. The composition of claim 7, wherein the pendent group includes a cyclic group, the cyclic group including the nitrogen.

9. The composition of claim 1, wherein the repeat unit comprises nitrogen bonded to a carbonyl group.

10. The composition of claim 1, wherein the non-radiation-curable polar polymer is selected from the group consisting of poly(N-vinylpyrrolidone), poly(N-vinyl-caprolactam), polyoxazoline and alkyl-substituted variations thereof.

11. The composition of claim 1, wherein the non-radiation-curable polar polymer is a copolymer.

12. The composition of claim 1, wherein the non-radiation-curable polar polymer lacks urethane linkages.

13. The cured product of the composition of claim 1, the cured product having a tensile strength at failure between 10 MPa and 45 MPa.

14. The cured product of the composition of claim 1, the cured product having a tensile strength at failure between 0.3 MPa and 5 MPa.

15. The cured product of the composition of claim 1, the cured product having a Young's Modulus between 0.3 MPa and 5 MPa.

16. The cured product of the composition of claim 1, the cured product having a Young's Modulus between 220 MPa and 2200 MPa.

17. A process for coating an optical film, comprising:
   providing an optical fiber;
   applying a primary coating composition to the optical fiber;
   applying a secondary coating composition to the optical fiber;
   wherein at least one of the primary and secondary coating compositions comprises at least one ethylenically unsaturated monomer, at least one non-radiation-curable polar polymer having a repeat unit that includes a pendent group comprising oxygen, and at least one photoinitiator.

18. The process of claim 17, further comprising curing the primary coating composition to form a primary coating.

19. The process of claim 18, wherein the primary coating is free of urethane groups.

20. The process of claim 18, further comprising curing the secondary coating composition to form a secondary coating.

21. The process of claim 20, wherein the secondary coating is free of urethane groups.

22. A coated optical waveguide, comprising:
   an optical waveguide;
   a primary coating surrounding the optical waveguide;
   a secondary coating surrounding the primary coating;
   wherein at least one of the primary coating and secondary coating is the cured product of a coating composition that includes at least one ethylenically unsaturated monomer and a non-radiation-curable polar polymer with a repeat unit having a pendent group that includes oxygen.

23. The optical waveguide of claim 22, wherein the non-radiation-curable polar polymer is a homopolymer or a copolymer of one or more monomers selected from oxazoline, substituted oxazolines, vinyl pyrrolidone, and acrylic monomers.

24. The optical waveguide of claim 23, wherein the non-radiation-curable polar polymer is poly(oxazoline) or poly(N-vinylpyrrolidone).

25. The optical waveguide of claim 22, wherein the primary coating is the cured product of a composition that includes the at least one ethylenically unsaturated monomer and the non-radiation-curable polar polymer, the primary coating having an in situ modulus of less than 0.20 MPa.

* * * * *